United States Patent [19]
Seno

[11] Patent Number: 5,940,628
[45] Date of Patent: Aug. 17, 1999

[54] CONTROL PROCESSOR FOR USER SETTING A CHANGE PROHIBITION PERIOD DURING WHICH A PROGRAM CHANGE COMMAND WILL NOT BE EXECUTED UNTIL THE LAPSE OF THAT PERIOD

[75] Inventor: Naoki Seno, Nagaokakyo, Japan

[73] Assignee: Omron Corporation, Kyoto, Japan

[21] Appl. No.: 08/684,812

[22] Filed: Jul. 22, 1996

[30] Foreign Application Priority Data

Jul. 21, 1995 [JP] Japan .................................. 7-185361

[51] Int. Cl.⁶ ...................................... G06F 13/00
[52] U.S. Cl. ............................. 395/879; 395/849
[58] Field of Search ............................. 345/430; 395/879, 395/557, 849; 475/129

[56] References Cited

U.S. PATENT DOCUMENTS

| | | | |
|---|---|---|---|
| 4,249,248 | 2/1981 | Yomogida et al. ...................... | 345/430 |
| 4,638,452 | 1/1987 | Schultz et al. ........................... | 364/900 |
| 4,688,449 | 8/1987 | Harada et al. ........................... | 475/129 |
| 5,155,812 | 10/1992 | Ehlig et al. ............................... | 395/879 |
| 5,471,608 | 11/1995 | Lee et al. ................................. | 395/557 |
| 5,491,815 | 2/1996 | Basso et al. ............................. | 395/557 |

FOREIGN PATENT DOCUMENTS

| | | |
|---|---|---|
| 0 321 575 | 6/1989 | European Pat. Off. . |
| 0 447 776 | 9/1991 | European Pat. Off. . |
| 0 090 302 | 10/1993 | European Pat. Off. . |

*Primary Examiner*—Thomas C. Lee
*Assistant Examiner*—David Ton
*Attorney, Agent, or Firm*—Foley & Lardner

[57] ABSTRACT

A programmable logic controller for executing a control process in a controlled apparatus in accordance with execution of a user program includes a flag set section for setting a change prohibition period therein about the user program stored in a user program memory, and a control process section responsive to receipt of a program change command in the change prohibition period set in the flag set section for suspending a program change process but executing the program change process after the lapse of the change prohibition period.

13 Claims, 6 Drawing Sheets

CONTROL PROCESSOR FOR USER SETTING A CHANGE PROHIBITION PERIOD DURING WHICH A PROGRAM CHANGE COMMAND WILL NOT BE EXECUTED UNTIL THE LAPSE OF THAT PERIOD

BACKGROUND OF THE INVENTION

1. Field of the Invention

This invention relates to a control processor for control-processing a controlled apparatus upon execution of a program.

2. Discussion of the Related Art

In conventional control processors such as programmable logic controllers, a control process consisting of a program execution process, an input and output process and a peripheral service process is repeatedly executed at a high speed after an initial process to control an operation of a controlled apparatus. Upon receiving an operation change instruction from a tool terminal connected to the control processor during control processing, the processor immediately executes a program change process at a timing of the peripheral service process to first execute a prior process of the operation after the program change process and to re-execute the control process in accordance with the program execution.

The conventional control processor, however, has the disadvantages that such program change process takes a fairly long time in comparison with the scan time and an operator inputs a program change command at a random timing by way of a tool terminal to provide undesired affection in an operation of the controlled apparatus or its system. In other words, immediately after receiving a program change command at the timing of the peripheral service process, the control processor executes the program change process at the peripheral service process timing, whereby the time for the peripheral service process is immediately prolonged and the scan time itself is also prolonged to fail to immediately control the operation state of the controlled apparatus or the system including the controlled apparatus even if input or control states change, resulting in undesired affection applied to the controlled apparatus.

SUMMARY OF THE INVENTION

It is, therefore, a primary object of this invention to provide an improved control processor which is free from any affection to a controlled operating system even when a program is requested to be changed during control processing.

According to a first aspect of this invention, there is provided a control processor for executing a control process in a controlled apparatus in accordance with execution of a user program, which includes a change prohibition period setting means for setting a change prohibition period for a program by the user program and a control processing means responsive to receipt of a program change command in the change prohibition period set by the change prohibition period setting means for suspending a program change process but executing the program change process after the lapse of the change prohibition period.

According to a second aspect of this invention, there is provided a control processor in which the control processing means when the program change command is received in a control processing and during the change prohibition period set by the change prohibition period setting means suspends the program change process but stores the program change command, and reads the stored program change command after the lapse of the change prohibition period to execute the program change process.

According to a third aspect of this invention, there is provided a control processor, in which the change prohibition period setting means includes a prohibition period directive flag applying start or end of the change prohibition period to the control processing means upon setting ON or OFF, and a flag set instruction employed in the program for setting the prohibition period directive flag to ON or OFF.

As a modification of the control processor according to the third aspect, there is provided a control processor in which the flag set instruction sets the prohibition period directive flag to ON only for a predetermined time period in accordance with a predetermined change of an input contact.

As another modification of the control processor according to the third aspect, there is provided a control processor in which the flag set instruction sets the prohibition period directive flag to ON only for a predetermined time period when a plurality of processes are simultaneously ON.

According to a fourth aspect of this invention, there is provided a control processor in which the change prohibition period setting means consists of a change prohibition period start instruction indicating the start of the change prohibition period of the program in accordance with a predetermined change of an input contact and a change prohibition period end instruction indicating the end of the change prohibition period of the program according to a predetermined change of the input contact.

As a modification of the control processor according to the fourth aspect of this invention, there is provided a control processor in which the change prohibition period end instruction is represented by change of the input contact of the change prohibition period start instruction and indicates the end of the change prohibition period of the program by way of a change opposite to the predetermined change of the input contact or the change prohibition period start instruction.

The foregoing control processors may be modified to a programmable logic controller such that a program execution process, an input-and-output process and a peripheral service process are cyclically and repeatedly executed to control the controlled apparatus and the program change process is executed when the peripheral service process is active.

Thus, according to this invention, the change prohibition period is set by the prohibition period directive flag and the flag set instruction employed in the program for setting the change prohibition period directive flag to ON for a predetermined time period according to the change of the input contact or for setting the flag to ON only during the time when a plurality of processes are simultaneously ON, or by the change prohibition period start instruction for directing the start of the program change prohibition period and the change prohibition period end instruction according to the predetermined change of the input contact.

This control processor is applicable to a programmable logic controller which cyclically and repeatedly executes a program execution process, an input-and-output process and a peripheral service process to control an operation of a controlled apparatus and executes a program change process during a peripheral service processing.

BRIEF DESCRIPTION OF THE DRAWINGS

Other objectives and advantages of this invention will be more readily apparent from the following detailed description provided in conjunction with the following figures, of which.

DETAILED DESCRIPTION OF THE INVENTION

Figure 1:
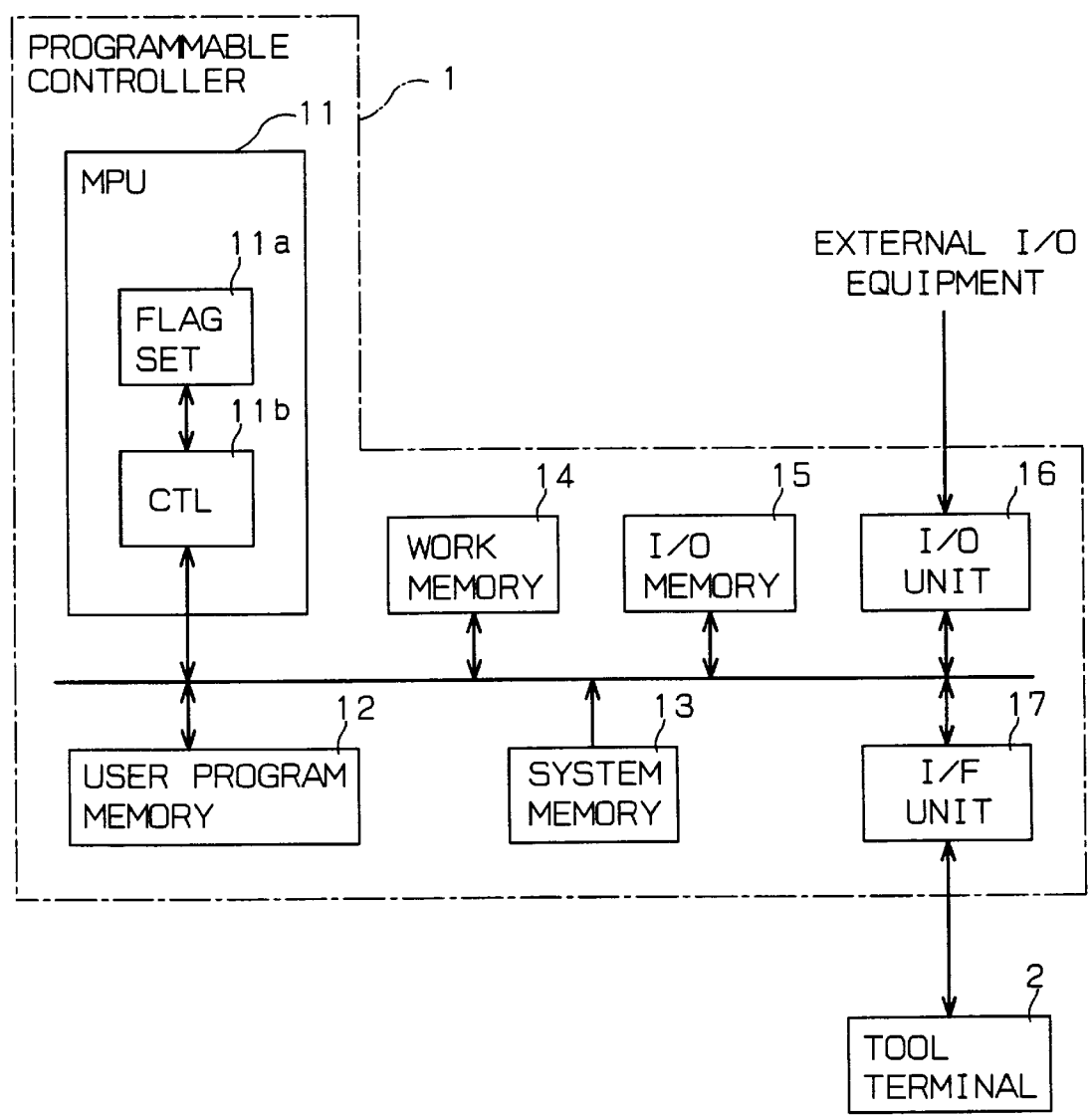
FIG. 1 is a schematic block diagram of a programmable logic controller as a control processor according to a first embodiment of this invention.

Referring, now, to FIG. 1, there is shown a schematic block diagram of a programmable logic controller 1 as a control processor according to a first embodiment of this invention, which includes a MPU (microprocessor) 11, a user program memory 12 storing a user program to be executed by the MPU 11, a system memory 13 storing a system program of the MPU 11, a work memory 14 serving as a work area for the MPU 11, an I/O (input-and-output) memory 15 storing I/O data conversing with an external I/O equipment, an I/O unit 16 associated with the external I/O equipment for executing an input-and-output process about data, and an I/F (interface) unit 17 connected with a tool terminal as an external apparatus.

The MPU 11 includes a flag set section 11a which sets a change prohibition period directive flag A for directing a change prohibition period of a program and a control (CTL) process section 11b which controls an operation in the external equipment as a controlled apparatus by executing the user program based on ON and OFF states of the change prohibition period directive flag A set in the section 11a.

The user program stored in the user program memory 12 is provided with ordinary instructions and additionally with a flag set instruction to set the change prohibition period directive flag A into the flag set section 11a. The tool terminal 2 is employed to change or program the user program and to set parameters or the like, and in this embodiment designed to transmit various kinds of commands such as program change command to the programmable logic controller 1.

Figure 2:
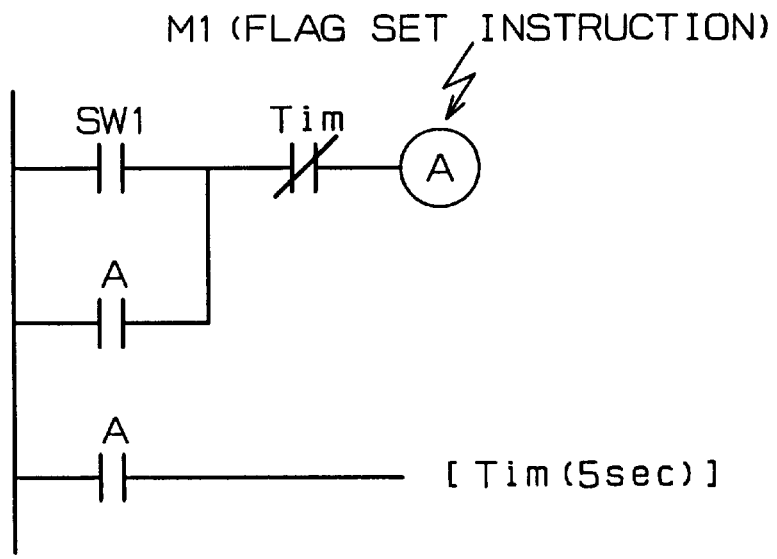
FIG. 2(a) shows one example of a flag set instruction M1 in the controller of FIG. 1.
FIG. 2(b) shows an operation thereof.
Figure 2:
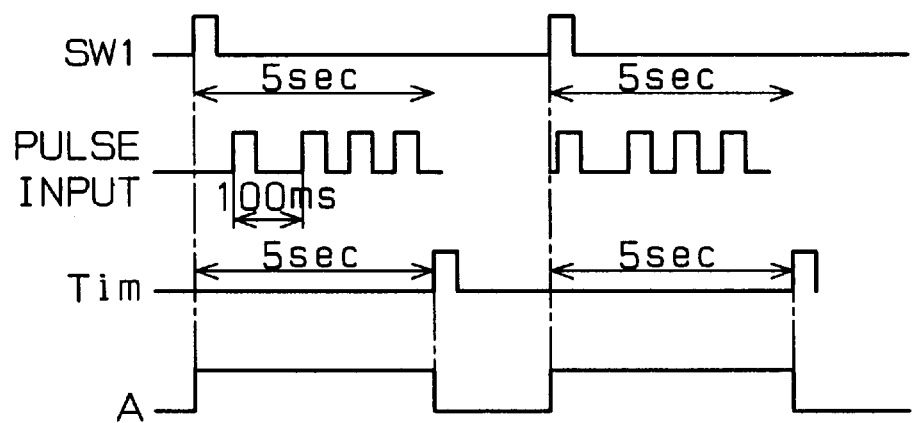

The flag set instruction employed in the user program stored in the user program memory 12 will be described hereinafter. FIGS. 2(a) and 2(b) show one example of the flag set instruction of this embodiment and an operation thereof.

FIG. 2(a) shows a construction of the flag set instruction M1 written in ladder language. Since a pulse is entered every 100 msec for about 5 seconds from rise of a switch SW1 and shall be precisely taken, the instruction M1 is designed to set a change prohibition period directive flag A in the flag set section 11a of the MPU 11 to ON upon the rise of switch SW1 to prohibit any change of the user program for 5 seconds from the rise of switch SW1, and to set the flag A to OFF after the lapse of the 5 seconds by actuating a 5 sec timer Tim. In the flag set instruction M1 a user can optionally set the switch SW1 and the setting time of the timer Tim by way of the tool terminal 2.

FIG. 2(b) shows a timing chart of various kinds of data in this processor according to execution of the flag set instruction M1. For about 5 seconds after the rise of switch SW1 a pulse is entered every 100 msec. Accordingly, the timer Tim is driven for about 5 seconds and the change prohibition period directive flag A is set to ON for the 5 seconds. Thus, according to this embodiment, the switch SW1 and the drive time of the timer Tim of the flag set instruction M1 may be set by the tool terminal 2 at will. The program change prohibition period can be set to an optional period according to an optional input condition.

Figure 3:
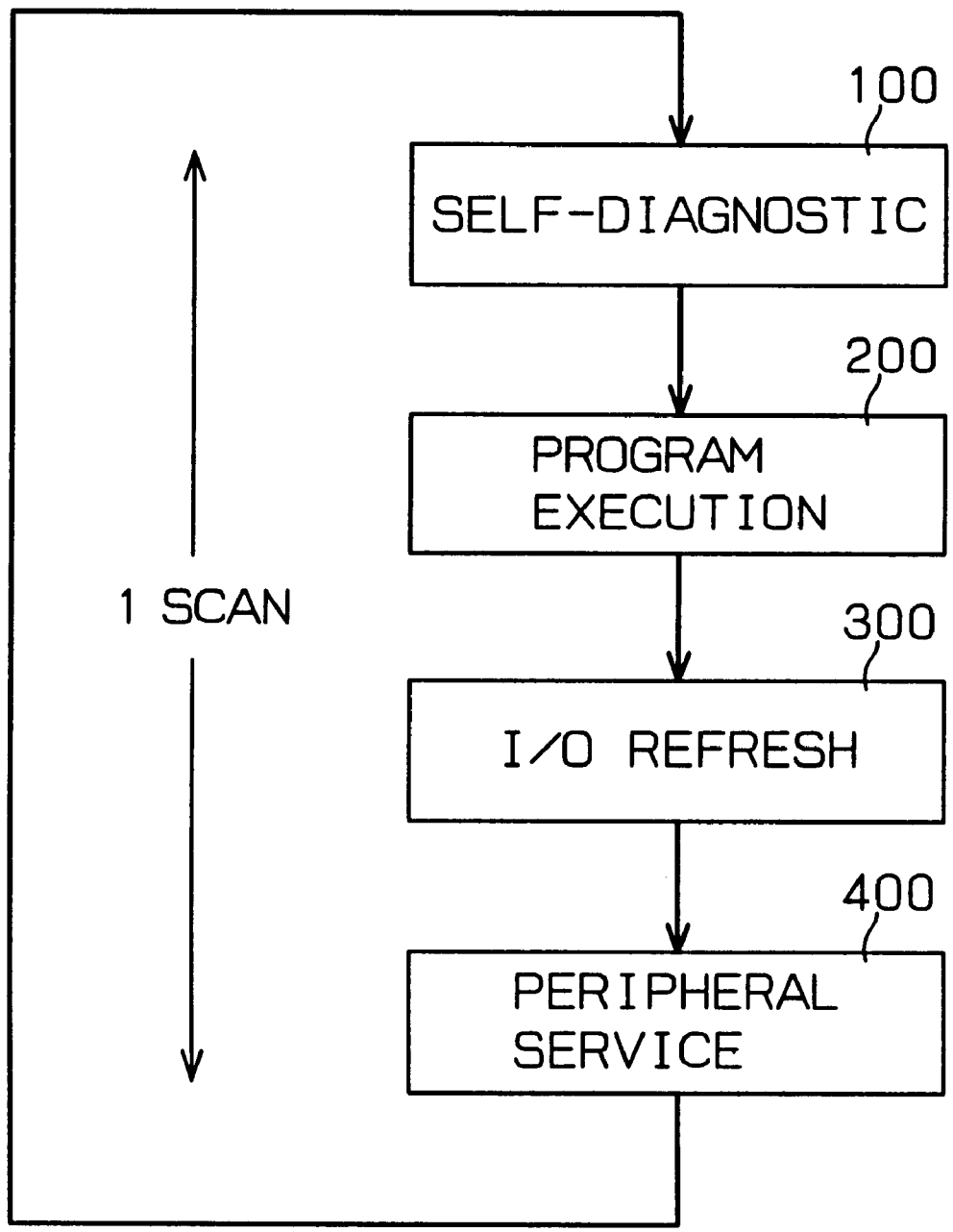
FIG. 3 shows a flow chart representing a whole process in the programmable logic controller.

In FIG. 3, there is shown in a flow chart representing the whole process in the programmable logic controller of this embodiment. Upon a start the programmable logic controller is initialized, and cyclically executes the sequence described later to drive and control a controlled equipment. In the sequence of FIG. 3, a self-diagnostic process is executed to check an anomaly in the user program memory and I/O bus in a step 100, a program execution process is executed to carry out the user program stored in the user program memory 12 for one scan from a head instruction to an end instruction in a step 200, an I/O refresh process is executed to refresh input-and-output data between the I/O memory 15 and the I/O unit 16 in a step 300, and a peripheral service process is executed to carry out a peripheral service based on a command through the tool terminal 2 in a step 400. A series of these processes are cyclically and repeatedly executed at a high speed to control the operation of the controlled equipment.

Figure 4:
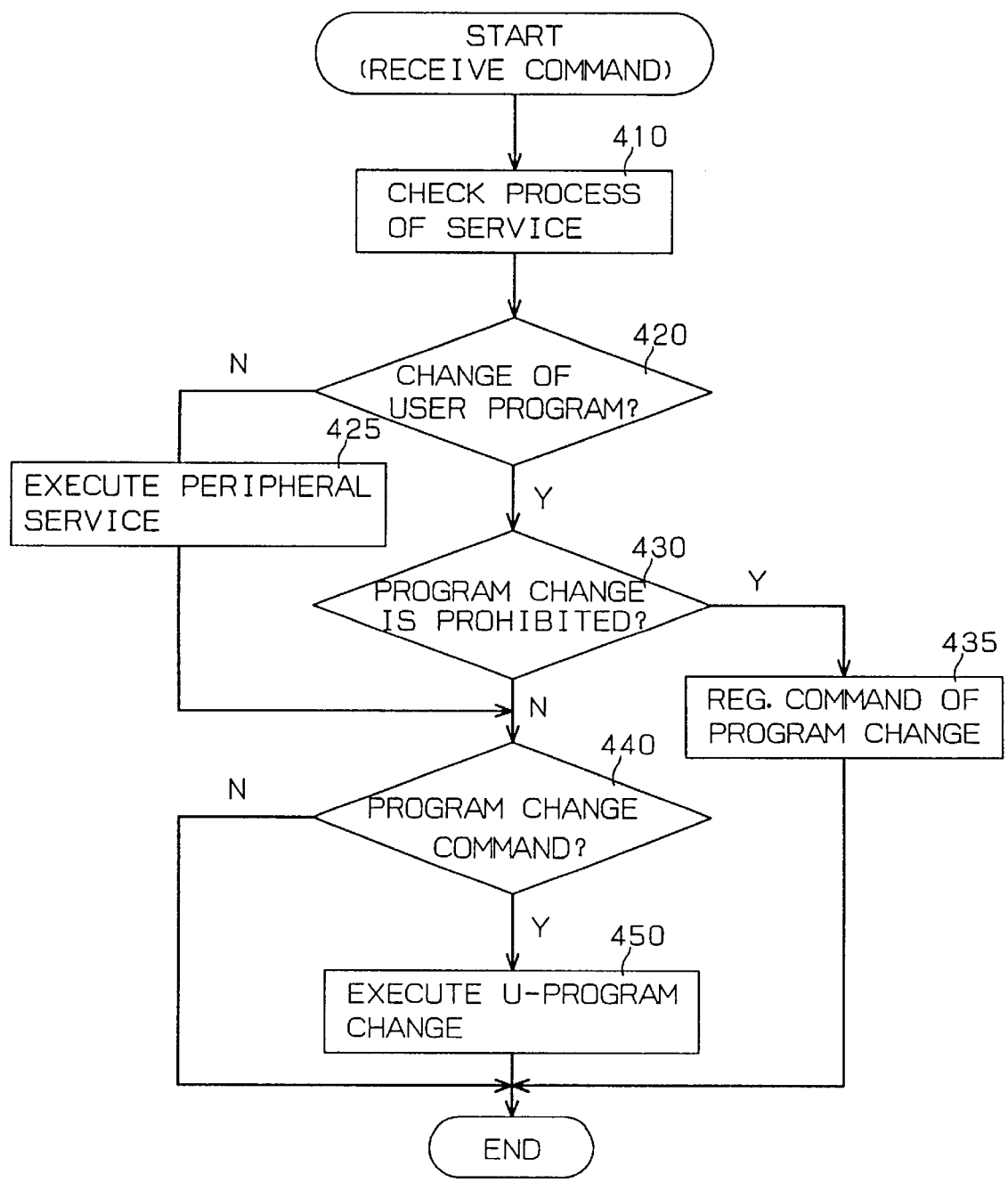
FIG. 4 shows a flow chart of a program change process in the controller.

The program logic controller 1 of this embodiment receives a program change command through the tool terminal 2 connected thereto and executes the program change process in the peripheral service process of the step 400 according to a sequence shown in FIG. 4. As the program change process is executed in the peripheral service process, one scan time is temporarily and fairly prolonged resulting in the cessation of the control operation by execution of the program.

FIG. 4 shows a flow chart of a program change process in the controller which is executed during the peripheral service process in the step 400 in the control processing as shown in FIG. 3 when a program change command is entered into this controller through the tool terminal 2. Upon receipt of the program change command by way of the tool terminal 2, this controller checks contents of the peripheral process to be serviced in accordance with the command in a step 410, and inquires if the command requests a change process of the user program in a step 420.

If the command is judged to be a change process request of the user program, a "Yes" response from the step 420 is applied to an inquiry step 430 wherein it is inquired if the change process of the program is prohibited or if a change prohibition period directive flag is set in the flag set section 11a of the MPU 11. If the change prohibition period directive flag is set to ON in the flag set section 11a, a "Yes" response is applied from the step 430 to a step 435 wherein the command of program change is registered in a predetermined area in a work memory 14 since the current timing is in a change prohibition state of the program. Thus, the peripheral service process (the step 400 of FIG. 3) shown in FIG. 4 is finished. In this sequence any program change process of the user program is not executed, and the sequence moves to a control process in the next cycle, whereby the sequence from the self-diagnostic process of the step 100 to the peripheral service process of the step 400 shown in FIG. 3 is repeatedly executed. Thus, according to this embodiment, if the change prohibition period directive flag is set to ON in the flag set section 11a, the change process about the user program is able to be prohibited wherein the operation of the controlled equipment can be controlled in normal cycle time without giving any affection to the operation of the controlled equipment or the system including the controlled equipment.

If the change prohibition period directive flag is set to OFF in the flag set section 11a, a NO response is applied from the step 430 to an inquiry step 440 wherein it is inquired by inspecting a predetermined area of the work area 14 if a program change command is registered because the current timing is in a change possible state. If a program change command is registered, a YES response is applied from the step 440 to a step 450 in which the user program stored in the user program memory 12 is changed in accordance with the program change command and the sequence is finished to move to the next cycle. Unless any program change command is registered, a NO response is produced from the step 440, the peripheral service process shown in FIG. 4 (the step 400 of FIG. 3) is finished and the sequence moves to the next cycle without executing any program change process about the user program. Thus, the sequence from the self-diagnostic process of the step 100 to the peripheral service process of the step 400 shown in FIG. 3 is repeatedly executed.

According to this embodiment, if a program change command is registered, the change process of the user program can be executed at the timing when the change prohibition period directive flag is OFF in the flag set section 11a, or during the peripheral service processing at the timing when the change of the program does not apply any undesired affection to the controlled equipment nor its system, so that the user program can be changed without applying any affection to the operation of the controlled equipment or the system.

If the command from the tool terminal 2 is judged to be not any change process of the user program in the inquiry step 420 (a NO response from the step 420), the peripheral service process designated by the command is executed according to the command (a step 425), and it is inquired if the program change command is registered in the former cycle by inspecting the predetermined area of the work area 14 (a step 440).

Since a YES response representing the registration of the program change command produced from the step 440 means that the program change command was received in the former cycle but any change process of the user program could not be executed because the change prohibition period directive flag is set to ON in the flag set section 11a, the change process of the user program stored in the user program memory 12 is executed in accordance with the registered program change command and subsequently the change prohibition period directive flag is reset to OFF (the step 440). Thus, the whole peripheral service process (the step 400 of FIG. 3) shown in FIG. 4 is finished unless any program change command is registered in the step 440 (unless any NO response is produced). Then the sequence moves to the next cycle without executing the program change process of the user program, and the sequence from the self-diagnostic process in the step 100 to the peripheral service process in the step 400 is repeatedly executed as described in conjunction with FIG. 3.

Thus, according to this first embodiment, any change process of the program is prohibited in a predetermined program change prohibition period even if a program change command is entered during the control process execution, so that the controlled apparatus and the system including the same can be prevented from any serious affection and a temporal protection can be applied to the system. In case a program change command is received in the program change prohibition period, the command is stored and the program change command is automatically executed after the lapse of the program prohibition period, so that any repeat operation for issuing an operation of the program change command can be avoided and the operation for the program change command is simplified.

Returning to FIG. 5(a), there is shown one example of a flag set instruction M2 in a programmable controller as a second embodiment of this invention. The programmable controller has the same hardware construction (of FIG. 1) and the same control process (of FIG. 3) as those of the first embodiment, except that any timer is not employed in a flag set instruction though a program change prohibition period that is set by setting a change prohibition period directive flag in flag set section 11a as constructed in the first embodiment.

The flag set instruction M2 unique to this second embodiment and the operation in the controller according to the instruction M2 will be described hereinafter in conjunction with the hardware of the first embodiment.

Figure 5:
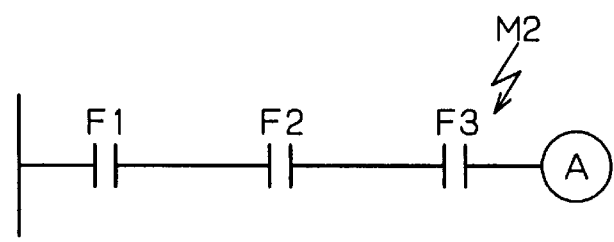
FIG. 5(a) shows one example of a flag set instruction M2 as a second embodiment.
FIG. 5(b) shows an operation thereof.
Figure 5:
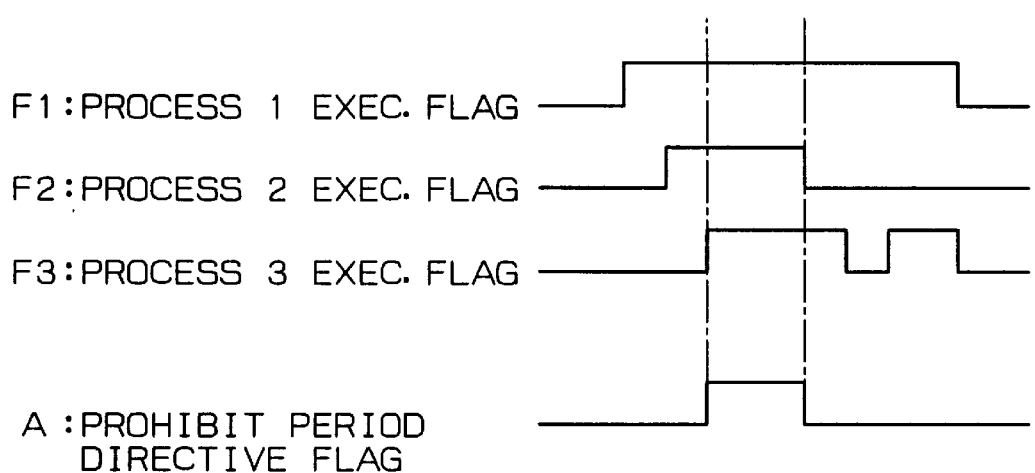

The flag set instruction M2 of FIG. 5(a) is so set in the user program that the change of contents of the user program is prohibited when three processes PROCESS 1, PROCESS 2 and PROCESS 3 to be asynchronously processed in parallel are simultaneously executed because the respective timing of the three processes must be very precise. The instruction M2 is so constructed that the simultaneous ON of the execution flags F1, F2 and F3 representing the active state of the three processes allows the change prohibition directive flag to be set to ON in the flag set section 11a.

FIG. 5(b) shows a timing chart by the flag set instruction M2. As described above referring to FIG. 5(a), only when the execution flags F1 through F3 about the PROCESSes 1 through 3 are set to ON, a change prohibition period directive flag A is set to ON and control process section 11b does not change the user program during the time even if the peripheral service process is executed.

Thus, according to this second embodiment, the flag set instruction M2 can prohibit any change process of the user program during a predetermined optional program change prohibition period even if a program change command is entered on execution of the control process, so that the controlled apparatus and the system including the same can be avoided from any serious affection and the instruction can be used as a temporal protection of the system. In case a program change command is received in the program change prohibition period, the program change command is stored and automatically executed after the lapse of the program prohibition period, so that any repeat operation for issuing an operation of the program change command can be avoided and the operation for the program change command is simplified.

Next, a program logic controller as a third embodiment of this invention which is modified from the foregoing first embodiment will be described hereinafter. A control operation by the control section 11b of the MPU 11 is executed by previously employing a change prohibition period start instruction M3 and a change prohibition period end instruction M4 in the user program which are exclusively employed to instruct a program change prohibition period without using the flag set section 11a nor executing a control process by recognizing a program change prohibition period set according to the set of the prohibition period directive flag A in the flag set section 11a. Other construction and control process such as a peripheral service in the controller of this embodiment are the same as those of the first embodiment. Accordingly, neglecting the flag set section 11a in FIG. 1, the instructions M3 and M4 designating the start and the end of the program change prohibition period unique to this embodiment and an operation of the controller by execution of the instructions M3 and M4 will be described hereinafter.

Figure 6:
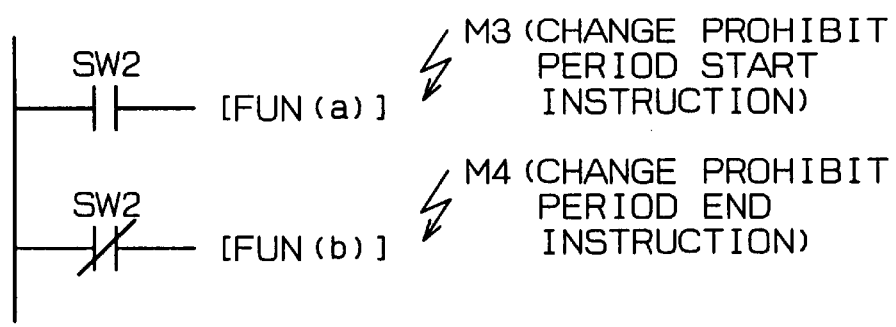
FIG. 6(a) shows one example of a flag set instruction M3 as a third embodiment.
FIG. 6(b) shows an operation thereof.
Figure 6:
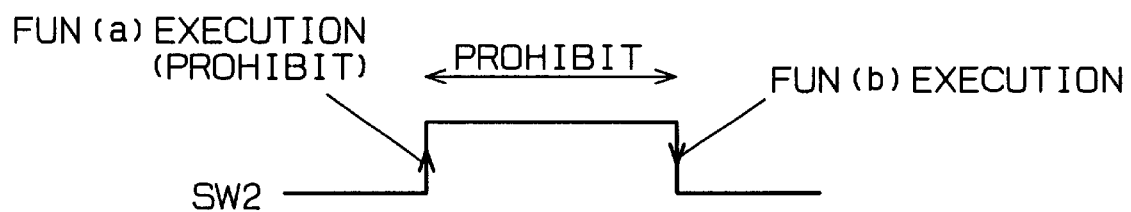

FIG. 6(a) shows a construction of the change prohibition period start instruction M3 and the end instruction M4 which are employed in the user program in this third embodiment. The change prohibition period start instruction M3 is designed to set to a program change prohibition state which is the content of FUN(a) upon turning on the switch SW2, and the change prohibition period end instruction M4 is designed to release the program change prohibition state which is the content of FUN(b) upon turning off the switch SW2.

FIG. 6(b) shows a timing chart of the instructions M3 and M4. The program change prohibition state is set by turning on the switch SW2, and released by turning off the switch SW2, whereby only in the ON state of the switch SW2, even if a program change command is entered through the tool terminal, the request is just registered and the change of the user program is prohibited, but when the switch SW2 is turned off, the change process of the user program is executed according to the program change command.

Though the same switch SW2 is used for the instructions M3 and M4, separate switches may be respectively employed or the ON and OFF operation may be optionally programmed by a user.

Thus, according to this third embodiment, the program change prohibition exclusive instruction M3 can prohibit any change process of the user program during a predetermined optional program change prohibition period even if a program change command is entered on execution of the control process, so that the controlled apparatus and the system including the same can be avoided from any serious affection and the instruction can be used as a temporal protection of the system. In case a program change command is received in the program change prohibition period, the program change command is stored and automatically executed after the lapse of the program prohibition period, so that any repeat operation for issuing an operation of the program change command can be avoided and the operation for the program change command is simplified without repeating an operation for issuing the program change command.

While the invention has been described and illustrated with respect to certain embodiments which give satisfactory results, it will be understood by those skilled in the art, after understanding the purpose of the invention, that various other changes and modifications may be made without departing from the spirit and scope of the invention, and it is, therefore, intended in the appended claims to cover all such changes and modifications.

What is claimed is:

1. A control processor for executing a control process in a controlled apparatus in accordance with execution of a user program, comprising:
    change prohibition period setting means for setting, by the user program, a change prohibition period for a program; and
    control processing means responsive to receipt of a program change command in the change prohibition period set by said change prohibition period setting means for suspending a program change process but executing said program change process after a lapse of the change prohibition period.

2. A control processor according to claim 1, in which said control processing means, when the program change command is received in a control processing and during the change prohibition period set by said change prohibition period setting means, suspends the program change process but stores the program change command, and reads said stored program change command after the lapse of the change prohibition period to execute the program change process.

3. A control processor according to claim 1, in which said change prohibition period setting means includes a prohibition period directive flag directing the start or end of the change prohibition period to said control processing means upon setting ON or OFF, and a flag set instruction employed in the program for setting said prohibition period directive flag to ON or OFF.

4. A control processor according to claim 3, in which said flag set instruction sets the prohibition period directive flag to ON only for a predetermined time period in accordance with a predetermined change of an input contact.

5. A control processor according to claim 3, in which said flag set instruction sets the prohibition period directive flag to ON only for a predetermined time period when a plurality of processes are simultaneously ON.

6. A control processor according to claim 1, in which said change prohibition period setting means includes a change prohibition period start instruction directing the start of the change prohibition period of the program in accordance with a first predetermined change of an input contact and a change prohibition period end instruction directing the end of the change prohibition period of the program according to a second predetermined change of the input contact.

7. A control processor according to claim 6, in which the change prohibition period end instruction is represented by change of the input contact of the change prohibition period start instruction and directs the end of the change prohibition period of the program by way of a change opposite to the predetermined change of said input contact of the change prohibition period start instruction.

8. A control processor according to claim 1, wherein said control processor comprises a programmable logic controller for cyclically and repeatedly executing a program execution process, an input-and-output process and a peripheral service process to control an operation of the controlled apparatus and for executing said program change process when said peripheral service process is active.

9. A control processor according to claim 2, in which said change prohibition period setting means includes a prohibition period directive flag directing the start or end of the change prohibition period to said control processing means upon setting ON or OFF, and a flag set instruction employed in the program for setting said prohibition period directive flag to ON or OFF.

10. A control processor according to claim 2, in which said change prohibition period setting means includes a change prohibition period start instruction directing the start of the change prohibition period of the program in accordance with a predetermined change of an input contact and a change prohibition period end instruction directing the end of the change prohibition period of the program according to a predetermined change of an input contact.

11. A control processor according to claim 3, wherein the control processor controls operation of a tool terminal, and wherein the prohibition period directive flag is set based on a command entered by way of the tool terminal.

12. A control processor according to claim 1, wherein the control processor controls operation of a tool terminal, and wherein the control processing means receives the program change command output from the tool terminal.

13. A control processor according to claim 9, wherein, when the program change command is received during one complete cycle which includes one iteration of the program execution process, the input-and-output process and the peripheral service process, and when the program change command was received during the change prohibition period that occurred at any time during the one complete cycle, the program change command will not be executed until a time within a next complete cycle.

* * * * *